(12) United States Patent
Allen et al.

(10) Patent No.: US 8,250,234 B2
(45) Date of Patent: Aug. 21, 2012

(54) HIERARCHICALLY DISASSEMBLING MESSAGES

(75) Inventors: Nicholas A. Allen, Redmond, WA (US); John A. Taylor, Bellevue, WA (US); Stefan R. Batres, Sammamish, WA (US); Bin Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 112 days.

(21) Appl. No.: 12/767,091

(22) Filed: Apr. 26, 2010

(65) Prior Publication Data
US 2011/0264738 A1    Oct. 27, 2011

(51) Int. Cl.
G06F 15/16 (2006.01)
G06F 12/00 (2006.01)
(52) U.S. Cl. .................................... 709/236; 709/206
(58) Field of Classification Search .................. 709/203, 709/206–207, 231, 236, 250
See application file for complete search history.

(56) References Cited

U.S. PATENT DOCUMENTS

| | | | |
|---|---|---|---|
| 5,339,392 A | 8/1994 | Risberg | |
| 5,371,889 A | 12/1994 | Klein | |
| 5,452,445 A | 9/1995 | Hallmark et al. | |
| 5,465,328 A | 11/1995 | Dievendorff | |
| 5,592,622 A | 1/1997 | Isfeld | |
| 5,802,310 A | 9/1998 | Rajaraman | |
| 5,913,213 A | 6/1999 | Wikstrom | |
| 5,974,442 A | 10/1999 | Adams | |
| 6,185,197 B1 | 2/2001 | Cheung | |
| 6,263,360 B1 | 7/2001 | Arnold | |
| 6,332,150 B1 | 12/2001 | Khan et al. | |
| 6,353,834 B1 | 3/2002 | Wong | |
| 6,463,480 B2 | 10/2002 | Kikuchi | |
| 6,484,196 B1 | 11/2002 | Maurille | |
| 6,748,583 B2 | 6/2004 | Aizenbud-Reshef et al. | |
| 6,817,018 B1 | 11/2004 | Clarke et al. | |
| 6,845,230 B2 | 1/2005 | Syed | |
| 6,848,108 B1 | 1/2005 | Caron | |
| 6,848,109 B1 | 1/2005 | Kühn | |
| 6,853,617 B2 | 2/2005 | Watson et al. | |
| 6,886,041 B2 | 4/2005 | Messinger et al. | |
| 6,886,169 B2 | 4/2005 | Wei | |
| 6,968,395 B1 | 11/2005 | Lee | |
| 6,971,001 B1 | 11/2005 | Rolfs | |
| 7,068,634 B2 * | 6/2006 | Vanttinen | 370/338 |
| 7,111,001 B2 | 9/2006 | Harris | |
| 7,149,976 B2 | 12/2006 | Yagati | |

(Continued)

FOREIGN PATENT DOCUMENTS
EP    1198106    4/2002
(Continued)

OTHER PUBLICATIONS

Bhatti, Nina T., et al., "A System for Constructing Configurable High-Level Protocols", 1995, 13 pages.

(Continued)

*Primary Examiner* — Zarni Maung
(74) *Attorney, Agent, or Firm* — Workman Nydegger

(57) ABSTRACT

The present invention extends to methods, systems, and computer program products for hierarchically disassembling messages. The functionality of disassemblers and framers is decoupled such that framers for different types of messages can be utilized at the same level in a hierarchy without having to also change disassemblers. Virtually any level of disassembly is possible to address any corresponding level of message nesting. Disassembly can be performed on a per message or per session basis.

9 Claims, 6 Drawing Sheets

U.S. PATENT DOCUMENTS

| | | | |
|---|---|---|---|
| 7,154,901 | B2 | 12/2006 | Chava et al. |
| 7,200,676 | B2 | 4/2007 | Christensen et al. |
| 7,240,350 | B1 | 7/2007 | Eberhard |
| 7,318,109 | B2 | 1/2008 | Liscano et al. |
| 7,330,860 | B2 | 2/2008 | Adiba |
| 7,370,329 | B2 | 5/2008 | Kumar |
| 7,380,135 | B2 | 5/2008 | Nishimoto et al. |
| 7,392,057 | B2 | 6/2008 | Lee |
| 7,409,428 | B1 | 8/2008 | Brabec |
| 7,434,225 | B2 | 10/2008 | Groetzner et al. |
| 7,527,558 | B2 | 5/2009 | Lavoie |
| 7,543,181 | B2 | 6/2009 | Buxton |
| 7,565,451 | B2 | 7/2009 | Cabrera |
| 7,631,108 | B2 | 12/2009 | Kesselman |
| 7,640,249 | B2 | 12/2009 | Smits |
| 7,802,263 | B2* | 9/2010 | Fuchs et al. ............... 719/314 |
| 7,865,684 | B2 | 1/2011 | Michaylov |
| 7,937,364 | B1 | 5/2011 | Chandrasekaran |
| 2001/0023482 | A1* | 9/2001 | Wray ............... 713/151 |
| 2002/0116538 | A1 | 8/2002 | Chen |
| 2004/0186918 | A1 | 9/2004 | Lonnfors |
| 2005/0147057 | A1* | 7/2005 | LaDue ............... 370/310 |
| 2005/0195820 | A1 | 9/2005 | Betts |
| 2005/0216917 | A1* | 9/2005 | Krishnaswamy et al. .... 719/315 |
| 2005/0278270 | A1 | 12/2005 | Carr |
| 2006/0053163 | A1 | 3/2006 | Liu et al. |
| 2006/0080579 | A1 | 4/2006 | Rothman et al. |
| 2006/0101064 | A1 | 5/2006 | Strong |
| 2006/0136367 | A1 | 6/2006 | Todd |
| 2006/0187902 | A1 | 8/2006 | Birch et al. |
| 2006/0230062 | A1 | 10/2006 | Roy-Chowdhury et al. |
| 2007/0005640 | A1 | 1/2007 | Klein |
| 2007/0027928 | A1 | 2/2007 | Majumdar |
| 2008/0288954 | A1* | 11/2008 | Fuchs et al. ............... 719/310 |
| 2009/0133036 | A1 | 5/2009 | Allen |
| 2009/0133037 | A1 | 5/2009 | Allen |
| 2009/0199208 | A1 | 8/2009 | Pinto |
| 2009/0216793 | A1 | 8/2009 | Szyperski |
| 2009/0222794 | A1 | 9/2009 | Pinto |
| 2009/0282396 | A1 | 11/2009 | Boyer |

FOREIGN PATENT DOCUMENTS

| | | |
|---|---|---|
| EP | 1873643 | 1/2008 |
| WO | WO2006118529 | 11/2006 |

OTHER PUBLICATIONS

Lee, Whay Sing, et al., "An Efficient, Protected Message Interface", Nov. 1998, pp. 69-75.

Bhoedjang, Raoul A.F., "Communication Architectures for Parallel-Programming Systems", Jun. 2000, 282 pages.

Office Action dated Oct. 5, 2011 cited in U.S. Appl. No. 12/019,041.

Office Action dated Oct. 13, 2011 cited in U.S. Appl. No. 12/018,401.

U.S. Appl. No. 12/605,236, filed Oct. 23, 2009, Pinto.

U.S. Appl. No. 12/727,066, filed Mar. 18, 2010, Allen.

Ceponiene, Lina, et al., "Transformation from Requirements to Design for Service Oriented Information Systems", ADBIS Research Communications, 2005, pp. 164-177.

Arbab, Farhad, "The Influence of Coordination on Program Structure", 1997 IEEE, pp. 300-309.

Zambonelli, Franco, et al., "Programmable Coordination Infrastructures for Mobility", 2001, 5 pages.

Arbab, Farhad, et al., "Coordination through Channel Composition", 2002, LNCS 2315, pp. 22-39.

Castro, Eva M., et al., Departamento de Ingenieria de Sistemas Telematicos Universidad Politecnica de Madrid DIT.UPM, "Reliable Multicast for Coordination of Cooperative Applications", http://jungla.dit.upm.es/~ecastro/ReliableMulticast/rmulticast.html, 1999, 1 page.

Guermouche, Abdou, et al., "A study of various load information exchange mechanisms for a distributed application using dynamic scheduling" Jan. 2005, 16 pages.

Albrecht, Jeannie, et al., "Remote Control: Distributed Application Configuration, Management, and Visualization with Plush", 2007, 16 pages.

Aaron Skonnard, Pluralsight, "A Developer's Introduction to Windows Communication Foundation (WCF).NET 4 Beta 1", Jul. 2009, 57 pages.

Nodine, Marian, et al., "Task Coordination Paradigms for Information Agents", Lecture Notes in Computer Science; vol. 1986, Proceedings of the 7th International Workshop on Intelligent Agents VII. Agent Theories Architectures and Languages, Year of Publication: 2000, 15 pages.

Onion, Fritz, "State Management in ASP.NET", informIT, May 30, 2003, 5 pages.

Allen, Nicholas, "Nicholas Allen's Indigo Blog—Future of Queuing", Windows Communication Foundation from the Inside, Dec. 1, 2008, 2 pages.

U.S. Appl. No. 13/432,341, filed Mar. 28, 2012, Allen.

U.S. Appl. No. 12/019,041, Mar. 12, 2012, Office Action.

U.S. Appl. No. 12/018,401, Apr. 5, 2012, Office Action.

Office Action dated Jun. 27, 2012 cited in U.S. Appl. No. 12/727,066 (Copy Attached).

* cited by examiner

HIERARCHICALLY DISASSEMBLING MESSAGES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

To optimize bandwidth when sending messages, it is not uncommon to batch a set of messages together. This process is sometimes referred to as message assembly. Similarly, the parsing effort of taking a single message and turning it back into a set of messages is sometimes referred to as disassembly. In some environments, the batching of messages may be further nested so that smaller batches are contained within larger batches.

Unfortunately, hierarchical nesting of messages introduces considerable difficulties for developing disassembly processors. For example, when multiple application messages have been packaged into a single transmission message, the task of disassembly is that of extracting the inner application messages so they can be presented to higher layers of a software stack. However, in some environments, the packaging is multilayered. The Electronic Data Interchange ("EDI") protocol is an example where the message structure is multiply nested. Multiple nesting can significantly complicate the disassembly process.

Many message patterns use a session, consisting of a set of message exchanges. Thus, the task of message disassembly can include creating a message session out of a single message (e.g., the outer message). Further, disassembly over disassembly (e.g., to get to nested messages) can require creating a longer session out of an existing session. However, many messaging patterns lack any notion of a sub-session making this difficult.

Various distinct functions must be performed in order to build a distributed messaging system, including: the physical transmission of data, a state-machine to implement a message exchange protocol, and the formatting of the message. Together these messaging functions are often referred to as the messaging stack. Many messaging systems couple together these distinct functions that comprise a messaging stack. Thus, each time one distinct function changes, all other associated functions must be also be re-written for compatibility. For example, this coupling can require that message formatting code be re-written when the transmission medium is changed, even if the new transmission medium semantically identical to the old transmission medium.

Some software frameworks provide abstractions for factoring the implementation of messaging stacks such that the discrete functions can be effectively implemented as separate components. However, existing frameworks have little, if any, support for abstractions that facilitate building session formatting logic. Lack of session formatting logic abstractions is especially problematic for the receive side disassembly. Depending on the format and arrangement of nested messages, session formatting logic can vary and may not be known at the time a message (e.g., the outer message) is received. However, the disassembly process may be fixed to a particular set of functions, which are unable to process nested messages.

BRIEF SUMMARY

The present invention extends to methods, systems, and computer program products for hierarchically disassembling messages. Embodiments of the invention include disassembling one or more messages. In some embodiments of message disassembly, a disassembler component, selected from among one or more disassembler components, receives a message from a component immediately below the disassembler component in a hierarchical arrangement of components. The message contains one or more nested messages within the message.

The disassembler component indicates a message type for the message to a framer factory. The framer factory provides a framer to the disassembler component. The framer is for parsing the message. The disassembler component indicates the start of a session to the component immediately above the disassembler component in the hierarchical arrangement of components. The session is between the disassembler component and the component immediately above the disassembler component.

For each of the one or more nested messages in the message, the framer parses the message to identify the next nested message, from among the one or more nested messages, contained within the message. For each of the one or more nested messages in the message, the disassembler component sends the identified next nested message to the session. The disassembler component indicates the end of the session to the component immediately above the disassembler component.

In other embodiments of message disassembly, a first disassembler component receives a message from a component immediately below the first disassembler component in the hierarchical arrangement of components. The message containing one or more nested messages within the message. The first disassembler component indicates the start of a session to the component immediately above the first disassembler component in the hierarchical arrangement of components. The session is between the first disassembler component and the component immediately above the first disassembler component. The first disassembler component sends one of the one or more nested messages within the message to the session.

A second disassembler component receives an indication of the start of a first session from a component immediately below the second disassembler component in the hierarchical arrangement of components. The first session is between the second disassembler component and the component immediately below the second disassembler component. The first session is responsive to the session indicated by the first disassembler component.

The second disassembler component receives a message on the first session from the component immediately below the second disassembler component in the hierarchical arrangement of components. The message contains one or more nested messages within the message. The message is responsive to the nested message sent by the first disassembler component.

The second disassembler component indicates the start of a second session to the component immediately above the second disassembler component in the hierarchical arrangement of components. The second session is between the second disassembler component and the component immediately above the second disassembler component.

The second disassembler component sends each of the one or more nested messages in the message, including a last nested message, to the component immediately above the second disassembler component subsequent to indicating the start of the second session. Sending the one or more nested messages includes the second disassembler component parsing the message to identify the next nested message, from among the one or more nested messages, contained within the message. Sending the one or more nested messages also includes the second disassembler component sending the identified next nested message to the second session.

The second disassembler component receives an indication of the end of the first session from the component immediately below the second disassembler component in the hierarchical arrangement of components. The second disassembler component indicates the end of the second session to the component immediately above the second disassembler component subsequent to sending the last nested message to the second session. The indication of the end of the second session is sent subsequent to receiving the indication of the end of the first session.

In further other embodiments, a message stack is creating for disassembling messages for an application. A messaging runtime receives a declarative specification for a messaging stack. The declarative specification specifies components for inclusion in a messaging stack for disassembling messages for the application. The declarative specification includes a transport component specification, one or more instances of a disassembler component specification, and one or more framer component specifications.

The runtime creates a message stack from the declarative specification. Creating a runtime includes forming a hierarchical linear set of execution components. The hierarchical linear set of execution components includes: (a) a lower layer transport component, (b) one or more dissembler components, and (c) upper layer application component. The lower layer transport component is configured in accordance with a transport component specification. The one or more dissembler components are configured in accordance with the disassembler component specification. Each disassembler component corresponds to one of the instances of the disassembler component specification respectively. The update layer application component corresponds to the application.

The messaging runtime carries forward a shared context as components are added to the hierarchical linear set of execution components. For each of the one or more framer component specifications, the message runtime adds the framer component specification to a portion of the shared context corresponding to one of the disassembler components. The one of the disassembler components is the disassembler component that is to utilize a framer component configured in accordance with the framer component specification to parse messages.

For each disassembler component, the messaging runtime creates a framer factory in the portion of shared context corresponding to the disassembler component. The framer factory is configured to receive a message from the disassembler component and return a framer component for the message to the disassembler component. The framer component is for containment within the disassembler component to parse the message to identify nested messages contained within the message. The framer component is configured in accordance with the framer component specification added to the portion of shared context corresponding to the disassembler component.

Each disassembler component is configured to receive messages from a component directly below the disassembler component in the hierarchical linear set of execution components. For each received message, the disassembler component calls the framer factory corresponding to the disassembler component with the received message, obtains a framer component from the framer factory to parse the message to identify any nested messages, and sends any nested messages to the component directly above the disassembler component in the hierarchical linear set of execution components.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
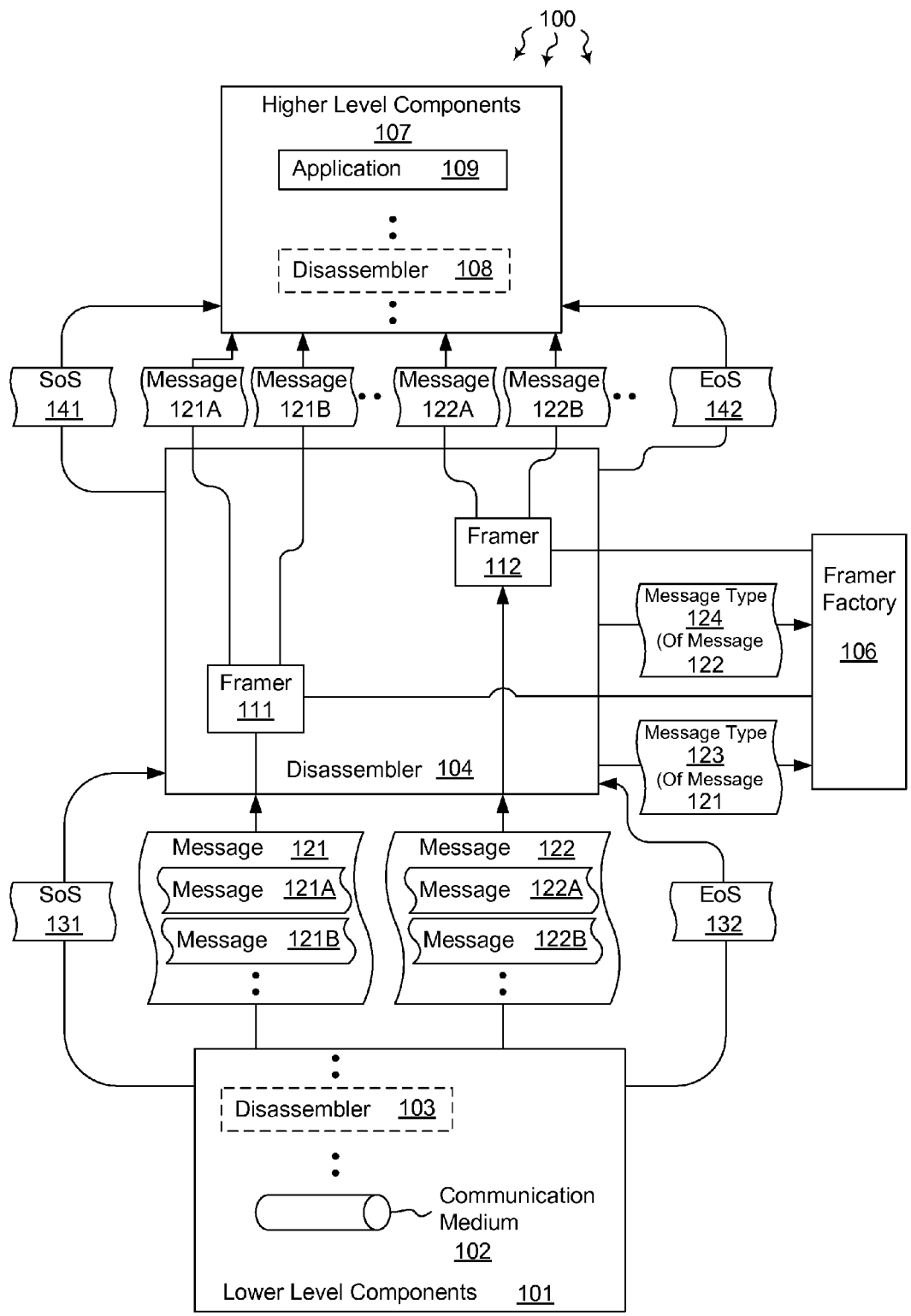
FIG. 1 illustrates an example computer architecture that facilitates hierarchically disassembling messages.

The present invention extends to methods, systems, and computer program products for hierarchically disassembling messages. Embodiments of the invention include disassembling one or more messages. In some embodiments of message disassembly, a disassembler component, selected from among one or more disassembler components, receives a message from a component immediately below the disassembler component in a hierarchical arrangement of components. The message contains one or more nested messages within the message.

The disassembler component indicates a message type for the message to a framer factory. The framer factory creates a framer contained within the disassembler component. The framer is for parsing the message. The disassembler component indicates the start of a session to the component immediately above the disassembler component in the hierarchical arrangement of components. The session is between the disassembler component and the component immediately above the disassembler component.

For each of the one or more nested messages in the message, the framer parses the message to identify the next nested message, from among the one or more nested messages, contained within the message. For each of the one or more nested messages in the message, the disassembler component sends the identified next nested message to the session. The disassembler component indicates the end of the session to the component immediately above the disassembler component.

In other embodiments of message disassembly, a first disassembler component receives a message from a component immediately below the first disassembler component in the hierarchical arrangement of components. The message containing one or more nested messages within the message. The first disassembler component indicates the start of a session to the component immediately above the first disassembler component in the hierarchical arrangement of components. The session is between the first disassembler component and the component immediately above the first disassembler component. The first disassembler component sends one of the one or more nested messages within the message to the session.

A second disassembler component receives an indication of the start of a first session from a component immediately below the second disassembler component in the hierarchical arrangement of components. The first session is between the second disassembler component and the component immediately below the second disassembler component. The first session is responsive to the session indicated by the first disassembler component.

The second disassembler component receives a message on the first session from the component immediately below the second disassembler component in the hierarchical arrangement of components. The message contains one or more nested messages within the message. The message is responsive to the nested message sent by the first disassembler component.

The second disassembler component indicates the start of a second session to the component immediately above the second disassembler component in the hierarchical arrangement of components. The second session is between the second disassembler component and the component immediately above the second disassembler component.

The second disassembler component sends each of the one or more nested messages in the message, including a last nested message, to the component immediately above the second disassembler component subsequent to indicating the start of the second session. Sending the one or more nested messages includes the second disassembler component parsing the message to identify the next nested message, from among the one or more nested messages, contained within the message. Sending the one or more nested messages also includes the second disassembler component sending the identified next nested message to the second session.

The second disassembler component receives an indication of the end of the first session from the component immediately below the second disassembler component in the hierarchical arrangement of components. The second disassembler component indicates the end of the second session to the component immediately above the second disassembler component subsequent to sending the last nested message to the second session. The indication of the end of the second session is sent subsequent to receiving the indication of the end of the first session.

In further other embodiments, a message stack is creating for disassembling messages for an application. A messaging runtime receives a declarative specification for a messaging stack. The declarative specification specifies components for inclusion in a messaging stack for disassembling messages for the application. The declarative specification includes a transport component specification, one or more instances of a disassembler component specification, and one or more framer component specifications.

The runtime creates a message stack from the declarative specification. Creating a runtime includes forming a hierarchical linear set of execution components. The hierarchical linear set of execution components includes: (a) a lower layer transport component, (b) one or more dissembler components, and (c) upper layer application component. The lower layer transport component is configured in accordance with a transport component specification. The one or more dissembler components are configured in accordance with the disassembler component specification. Each disassembler component corresponds to one of the instances of the disassembler component specification respectively. The update layer application component corresponds to the application.

The messaging runtime carries forward a shared context as components are added to the hierarchical linear set of execution components. For each of the one or more framer component specifications, the message runtime adds the framer component specification to a portion of the shared context corresponding to one of the disassembler components. The one of the disassembler components is the disassembler component that is to utilize a framer component configured in accordance with the framer component specification to parse messages.

For each disassembler component, the messaging runtime creates a framer factory in the portion of shared context corresponding to the disassembler component. The framer factory is configured to receive a message from the disassembler component and return a framer component for the message to the disassembler component. The framer component is for containment within the disassembler component to parse the message to identify nested messages contained within the message. The framer component is configured in accordance with the framer component specification added to the portion of shared context corresponding to the disassembler component.

Each disassembler component is configured to receive messages from a component directly below the disassembler component in the hierarchical linear set of execution components. For each received message, the disassembler component calls the framer factory corresponding to the disassembler component with the received message, obtains a framer component from the framer factory to parse the message to identify any nested messages, and sends any nested messages to the component directly above the disassembler component in the hierarchical linear set of execution components.

In some embodiments, reusable framer components can be embedded in disassembler components to detect the boundaries between fragments within a message to transform a single message into a stream of sub-messages. The framer and disassembler are composable within a message processing hierarchy allowing them to be used together with other messaging components as well as supporting the stacking of multiple disassemblers to decompose a hierarchically structured batch of messages. The hierarchical structure of disassemblers can be fully constructed from one or more flat specifications.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates hierarchically disassembling messages. Referring to FIG. 1, computer architecture 100 includes lower level components 101, disassembler 104, framer factory 106, and higher level components 107. Each of the depicted components can be connected to one another over a system bus and/or a network, such as, for example, a Local Area Network ("LAN"), a Wide Area Network ("WAN"), and even the Internet. Accordingly, each of the depicted components as well as any other connected computer systems and their components, may create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, lower level components 101 include communication medium 102 (e.g., a lower level transport component) and optional disassembler 103. Generally, a message is received on communication medium 102. The message is optionally passed up through other components of lower level components 101, including disassembler 103. Disassembler 103 can be one of one or more disassemblers optionally included in lower level components 101. Thus, it may be that a message is passed from communication medium 102 directly to disassembler 104. Alternately, a message may be passed from communication medium 102 through one or more optional disassemblers included in lower level components 101. The last optional disassembler then passes the message (or portion thereof) to disassembler 104.

After passing through lower level components 101, messages (or at least a portion there of) are passed up to disassembler 104. Upon receiving a message, disassembler 104 indicates a message type to framer factory 106. In some embodiments, disassembler 104 determines the message type and sends the message type to framer factory 106. In other embodiments, disassembler 104 sends the message to framer factory 106 and framer factory 106 determines the message type.

In response to receiving a message type, framer factory 106 loads a framer contained within disassembler 104. Disassembler 104 uses the framer to access any nested messages with the received message. Any accessed nested messages are individually passed up to higher level components 107. When the last nested message is accessed and passed up to higher level components 107, the contained framer may be destroyed.

As depicted, higher level components 107 includes application 109 and optional disassembler 108. Generally, higher level components 107 receive a message from disassembler 104. The message is optionally passed up through other components of higher level components 107, including disassembler 108. Disassembler 108 can be one of one or more disassemblers optionally included in higher level components 107. The message (of at least a portion thereof) is delivered to application 109.

Other optionally included disassemblers, such as, for example, disassemblers 103 and 108, can also utilize framer factory 106 to access nested messages. The accessed nested messages can then be individually passed up to higher level components. Accordingly, multiply nested messages can be accessed and processed at an application.

Figure 2:
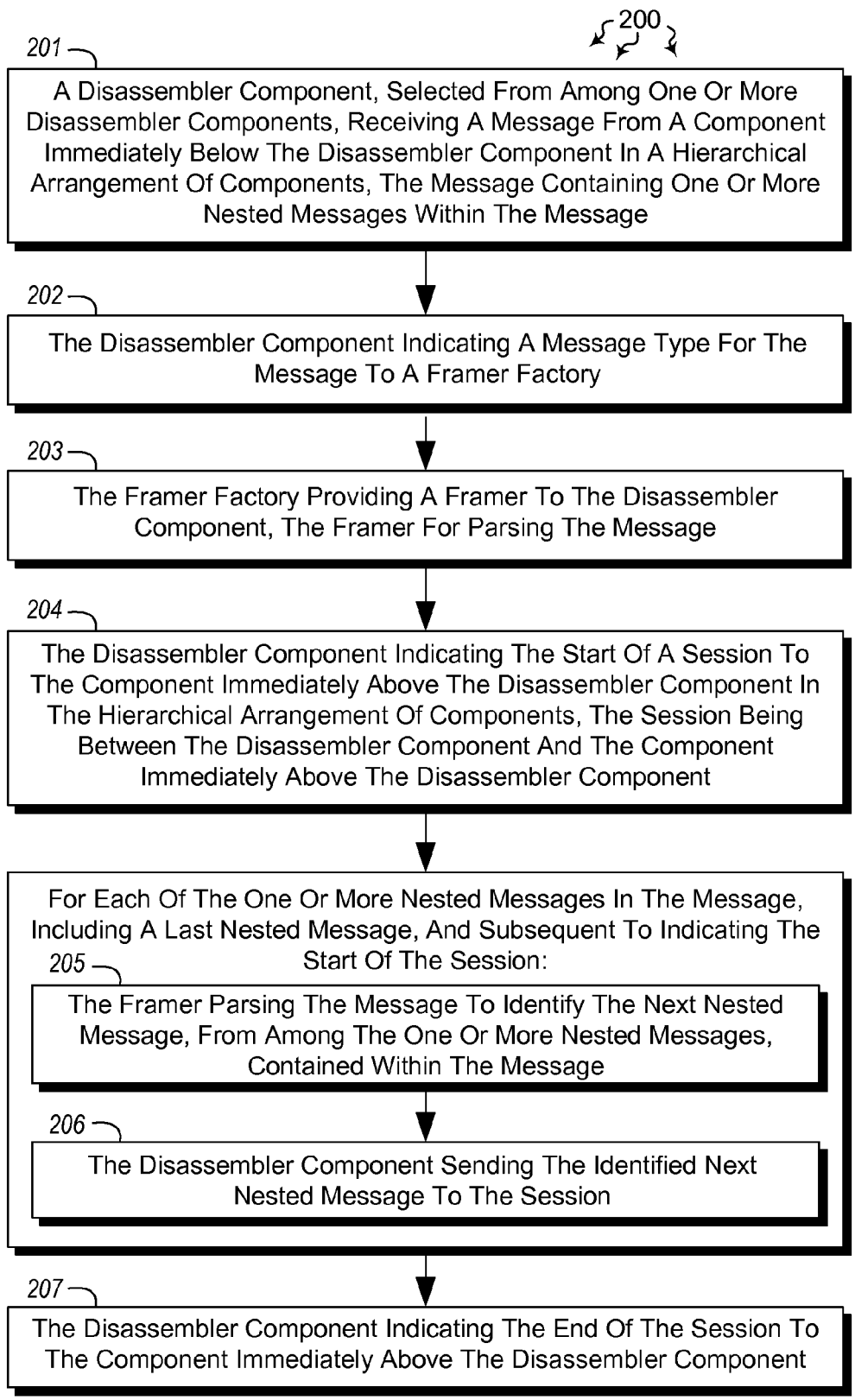
FIG. 2 illustrates a flow chart of an example method for hierarchically disassembling messages.

FIG. 2 illustrates a flow chart of an example method 200 for hierarchically disassembling messages. Method 200 will be described with respect to the components and data of computer architecture 100.

Method 200 includes an act of a disassembler component, selected from among the one or more disassembler components, receiving a message from a component immediately below the disassembler component in the hierarchical arrangement of components, the message containing one or more nested messages within the message (act 201). For example, disassembler 104 can receive message 121 from a component in lower level components 101. In some embodiments, disassembler 104 receives a message directly from communication medium 102. In other embodiments, disassembler 104 receives a message from disassembler 103 or some other disassembler included in lower level components 101. As depicted, message 121 contains nested messages 121A, 121B, etc.

However, message 121 (as well as other messages) can have virtually any level of nesting. Messages can include batched Electronic Data Interchange (EDI) messages containing deeply nested hierarchical levels of messages.

Method 200 includes an act of the disassembler component indicating a message type for the message to the framer factory (act 202). For example, disassembler 140 can indicate message type 123 (of message 122) to framer factory 106. Message type 123 can be a message type determined by disassembler 104. Alternately, message type 123 can be determined by framer factory 106 upon receiving message 122.

Method 200 includes an act of the framer factory creating a framer contained within the disassembler component, the framer for parsing the message (act 203). For example, framer factory 106 can created framer 111 contained within disassembler 104. Framer 111 is configured to parse message 121.

Method 200 includes an act of the disassembler component indicating the start of a session to the component immediately above the disassembler component in the hierarchical arrangement of components, the session being between the disassembler component and the component immediately above the disassembler component (act 204). For example, disassembler 104 can send Start of Session (SoS) 141 to a component in higher level components 107. SoS 141 can be sent to a disassembler component included in higher level components 107, such as, for example, to disassembler 108. Alternatively, SoS 141 can be sent to application 109. In response, a session can be established between disassembler 104 and another disassembler in higher level components 107 or between disassembler 104 and application 109 as appropriate.

For each of the one or more nested messages in the message, including a last nested message, and subsequent to indicating the start of the session, method 200 includes an act of the framer parsing the message to identify the next nested message, from among the one or more nested messages, contained within the message (act 205) and an act of the disassembler component sending the identified next nested message to the session (act 206). For example, framer 111 can parse message 121 to identify message 121A. Disassembler 104 can then send message 121A to the higher level component, whether it be another disassembler or application 109. Next, framer 111 can parse message 121 to identify message 121B. Disassembler 104 can then send message 121B to the higher level component, whether it be another disassembler or application 109. This can continue until the last nested message contained in message 121 is identified and sent to the higher level component.

The framer may be destroyed subsequent to sending the last nested message within the message to the session. For example, framer 111 may be destroyed subsequent to disassembler 104 sending the last nested message within message 121 to the higher level component.

Method 200 includes an act of the disassembler indicating the end of the session to the component immediately above the disassembler component (act 207). For example, disassembler 104 can send End of Session (EoS) 142 to the component in higher level components 107, such as, for example, to disassembler 108 to application 109.

It may also be that a component in lower level components 101 (a disassembler or communication medium 102) sends an indication of a start of a session to disassembler 104. For example, a component in lower level components 101 can send Start of Session (SoS) 131 to disassembler 104. In response, a session can be established between the lower level component and disassembler 104. Message 121 can be sent from the lower level component to disassembler 104 over the session.

One or more other messages can also be sent on a session between the lower level component and disassembler 104. For example, message 122 can be sent from the lower level component to disassembler 104. As depicted, message 122 contains nested messages 122A, 122B, etc. Upon receiving message 122, disassembler 104 can indicate a message type for message 122 to framer factory 106. For example, disassembler 104 can send message type 124 to framer factory 106. In response, framer factory 106 can create framer 112 contained within disassembler 104.

For each nested message contained in message 122, framer 112 can parse message 122 to identify the next nested message and send the identified next nested message a component in higher level components 107. For example, framer 112 can parse message 122 to identify message 122A. Disassembler 104 can then send message 122A to the higher level component, whether it be another disassembler or application 109. Next, framer 112 can parse message 122 to identify message 122B. Disassembler 104 can then send message 122B to the higher level component, whether it be another disassembler or application 109. This can continue until the last nested message contained in message 122 is identified and sent to the higher level component.

When the lower level component no longer has messages for disassembler 104, the lower level component can indicate the end of the session between the lower level component and disassembler 104. For example, a lower level component in lower level components 101 can send End of Session (EoS) 132 to disassembler 104. Disassembler 104 can receive EoS 132. EoS 132 indicates to disassembler 104 that the lower level component no longer has messages for disassembler 104. In response to EoS 132, framer 112 may be destroyed. It may also be that EoS 142 is sent in response to receiving EoS 132.

Figure 3:
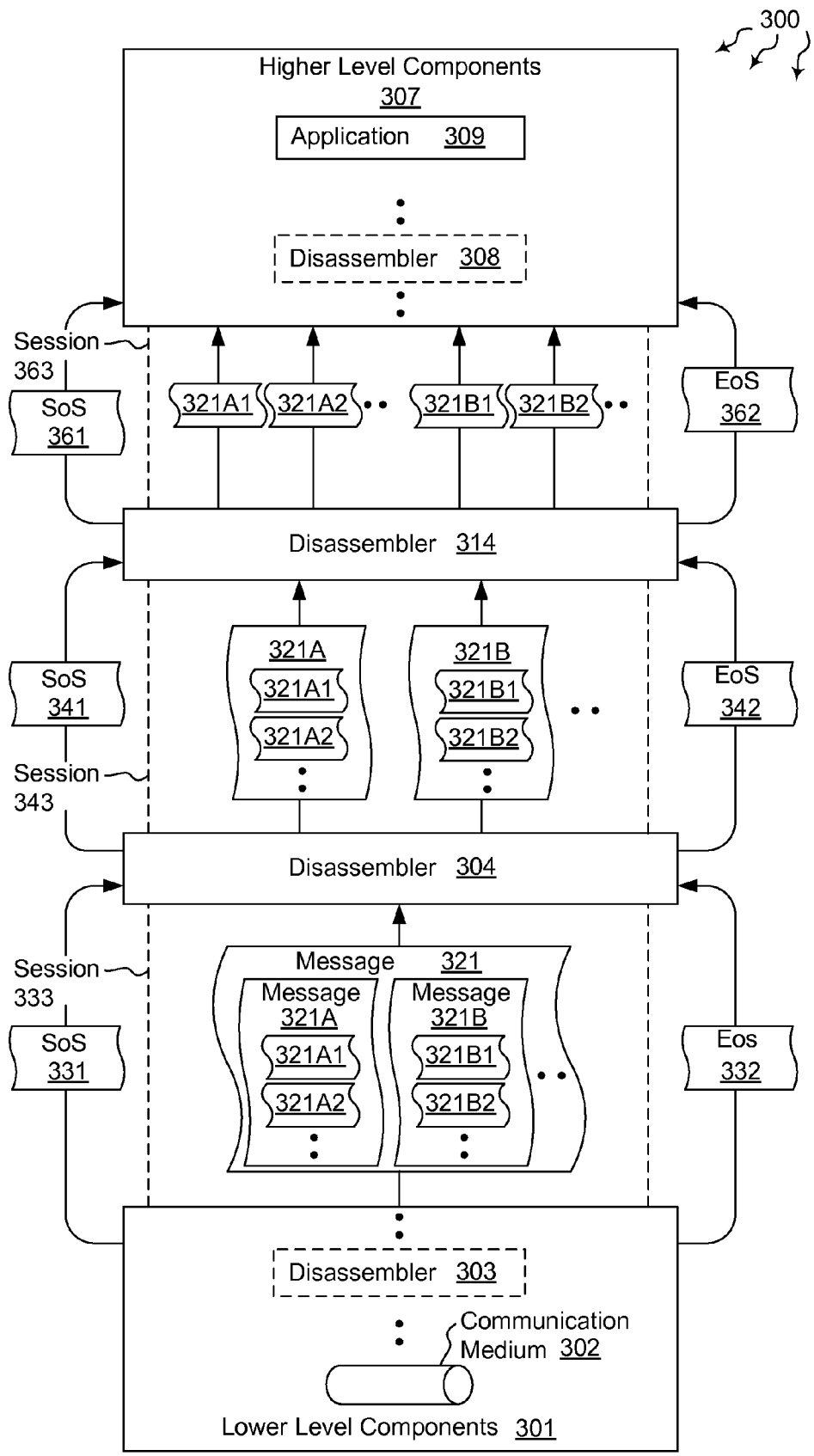
FIG. 3 illustrates another example computer architecture that facilitates hierarchically disassembling messages.

FIG. 3 illustrates a computer architecture 300 that facilitates hierarchically disassembling messages. Referring to FIG. 3, computer architecture 300 includes lower level components 301, disassembler 304, disassembler 314, and higher level components 307. Each of the depicted components can be connected to one another over a system bus and/or a network, such as, for example, a Local Area Network ("LAN"), a Wide Area Network ("WAN"), and even the Internet. Accordingly, each of the depicted components as well as any other connected computer systems and their components, may create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, lower level components 301 include communication medium 302 (e.g., a lower level transport component) and optional disassembler 303. Generally, a message is received on communication medium 302. The message is optionally passed up through other components of lower level components 301, including disassembler 303. Disassembler 303 can be one of one or more disassemblers optionally included in lower level components 301. Thus, it may be that a message is passed from communication medium 302 directly to disassembler 304. Alternately, a message may be passed from communication medium 302 through one or more optional disassemblers included in lower level components 301. The last optional disassembler then passes the message (or portion thereof) to disassembler 304.

As depicted, higher level components 307 includes application 309 and optional disassembler 308. Generally, higher level components 307 receive a message from disassembler 314. The message is optionally passed up through other components of higher level components 307, including disassembler 308. Disassembler 308 can be one of one or more disassemblers optionally included in higher level components 307. The message (of at least a portion thereof) is delivered to application 309.

Referring briefly back to FIG. 1, other optionally included disassemblers, such as, for example, disassemblers 103 and 108, can be used to access nested messages that are then individually passed up to higher level components. Accordingly, multiply nested messages can be accessed and processed at an application. Disassemblers in computer architecture 300 may or may not utilize a framer factory and/or framers.

Figure 4:
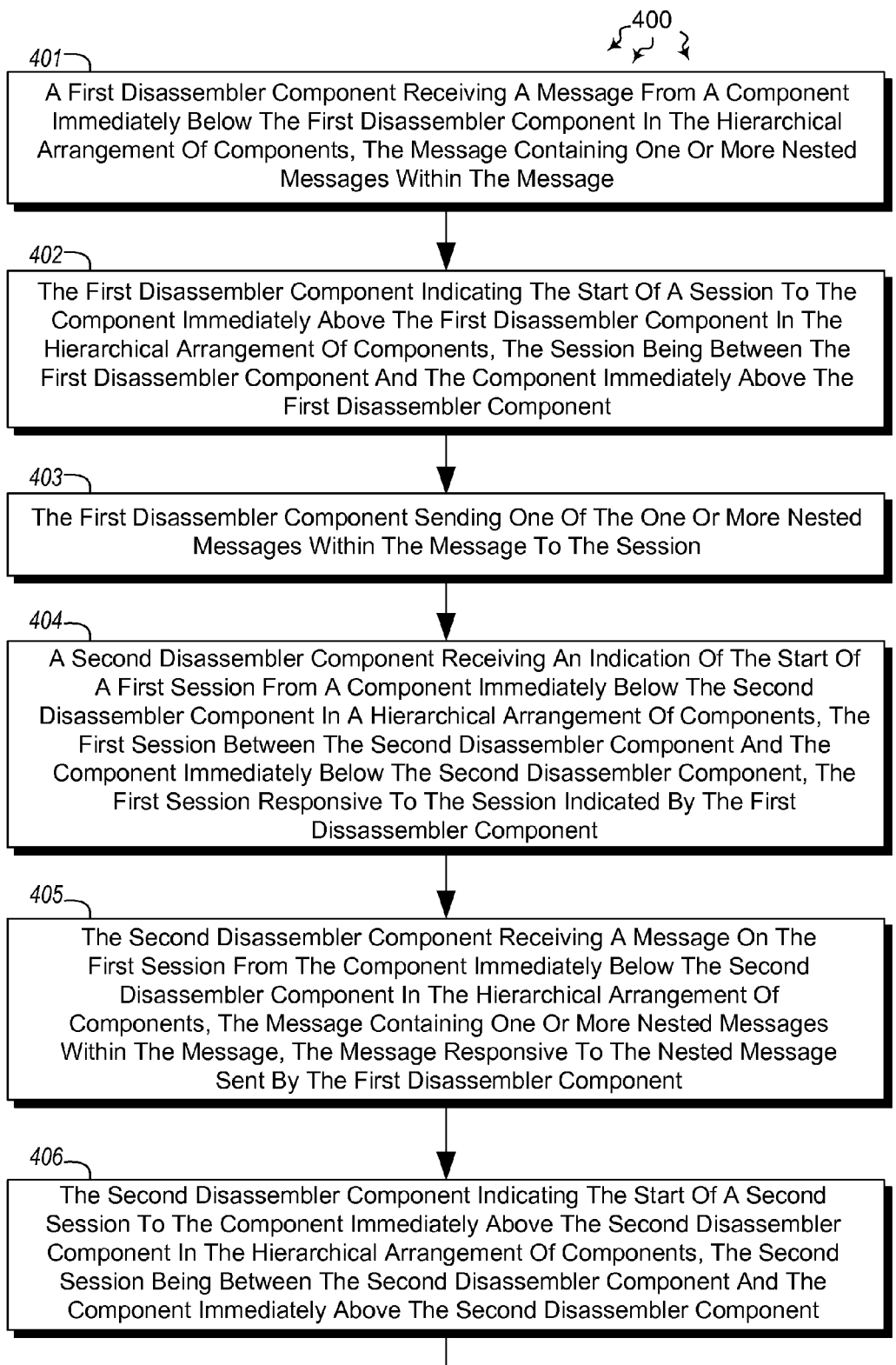
FIG. 4 illustrates flow chart of another example method for hierarchically disassembling messages.
Figure 4:
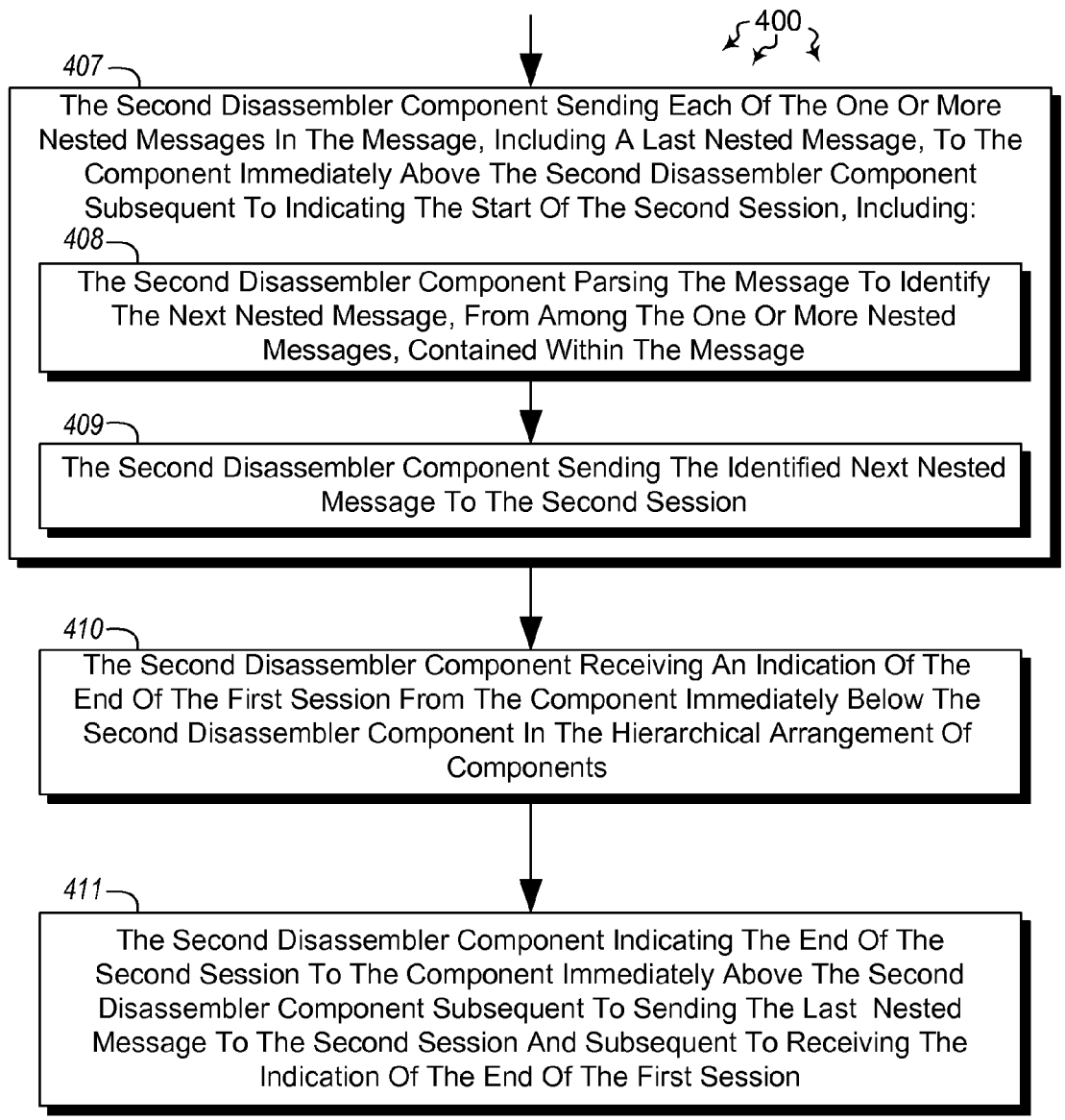

FIG. 4 illustrates flow chart of an example method 400 for hierarchically disassembling messages. Method 400 will be described with respect to the components and data of computer architecture 300. In some embodiments, a lower level component in lower level components 301 (e.g., communication medium 302, disassembler 303, or some other disassembler) sends Start of Session (SoS) 331 to disassembler 304. Disassembler 304 can receive SoS 331 from the lower level component. In response, session 333 can be established between the lower level component and disassembler 304.

Method 400 includes an act of the first disassembler component receiving a message from a component immediately below the first disassembler component in the hierarchical arrangement of components, the message containing one or more nested messages within the message (act 401). For example, disassembler 304 can receive message 321 from the lower level component in lower level components 301 (e.g., communication medium 302, disassembler 303, or some other disassembler). As depicted, message 321 includes nested messages 321A, 321B, etc.

Method 400 includes an act of the first disassembler component indicating the start of a session to the component immediately above the first disassembler component in the hierarchical arrangement of components, the session being between the first disassembler component and the component immediately above the first disassembler component (act 402). Method 400 includes an act of a second disassembler component receiving an indication of the start of a first session from the component immediately below the second disassembler component in the hierarchical arrangement of components, the first session between the second disassembler component and the component immediately below the second disassembler component, the first session responsive to session indicated by the first disassembler component (act 404). For example, disassembler 304 can indicate Start of Session (SoS) 341 to disassembler 314. Disassembler 314 can receive SoS 341 from disassembler 304. In response, session 343 can be established between the lower level component and disassembler 304.

Method 400 includes an act of the first disassembler component sending one of the one or more nested messages within the message to the session (act 403). For example, disassembler 304 can send messages 321A, 321B, etc., to session 343. Method 400 includes an act of the second disassembler component receiving a message on the first session from the component immediately below the second disassembler component in the hierarchical arrangement of components, the message containing one or more nested messages within the message, the message responsive to the nested message sent by the first disassembler (act 405). For example, disassembler 314 can receive messages 321A, 321B, etc., from disassembler 304 on session 343 can receive message 321 on session 333. As depicted, message 321A contains nested messages 321A1, 321A2, etc. and message 321B contains messages 321B1, 321B2, etc.

Method 400 includes an act of the second disassembler component indicating the start of a second session to the component immediately above the second disassembler component in the hierarchical arrangement of components, the second session being between the second disassembler component and the component immediately above the second disassembler component (act 406). For example, disassembler 314 can send Start of Session (SoS) 361 to a component in higher level components 307 (e.g., disassembler 308, some other disassembler, or application 309). The higher level component can receive SoS 361 from disassembler 314. In response, session 363 can be established between disassembler 314 and the higher level component.

Method 400 includes an act of the second disassembler component sending each of the one or more nested messages in the message, including a last nested message, to the component immediately above the second disassembler component subsequent to indicating the start of the second session (act 407). For example, disassembler 314 can send messages 321A1, 3211A2, 321B1 321B2, etc., to the higher level component on session 363.

Act 407 can include an act of the second disassembler component parsing the message to identify the next nested message, from among the one or more nested messages, contained within the message (act 408) and an act of second disassembler component sending the identified next nested message to the second session (act 409). For example, disassembler 314 can parse message 321A to identify message 321A1, 321A2, etc. Disassembler 314 can then send messages 321A1, 321A2, etc., to higher level component on session 363. Next, disassembler 304 can parse message 321B to identify messages 321B1, 321B2, etc. Disassembler 314 can then send messages 321B1, 321B2, etc., to the higher level component on session 363. This can continue until the last nested message contained in message 321 is parsed and any nested messages are sent to the higher level component.

When the lower level component no longer has messages for disassembler 304, the lower level component can indicate the end of the session between the lower level component and disassembler 304. For example, a lower level component in lower level components 301 can send End of Session (EoS) 332 to disassembler 304. Disassembler 304 can receive EoS 332. EoS 332 indicates to disassembler 304 that the lower level component no longer has messages for disassembler 304.

Method 400 includes an act of the second disassembler component receiving an indication of the end of the first session from the component immediately below the second disassembler component in the hierarchical arrangement of components (act 410). For example, when disassembler 304 no longer has messages for disassembler 314, disassembler 304 can indicate the end of session 343. For example, disassembler 304 can send End of Session (EoS) 342 to disassembler 314. Disassembler 304 can receive EoS 342. EoS 342 indicates to disassembler 314 that disassembler 304 no longer has messages for the disassembler 314.

Method 400 includes an act of the second disassembler component indicating the end of the second session to the component immediately above the second disassembler component subsequent to sending the last nested message to the second session and subsequent to receiving the indication of the end of the first session (act 411). For example, when disassembler 314 no longer has messages for the higher level component, disassembler 314 can indicate the end of session 363. For example, disassembler 314 can send End of Session (EoS) 362 to the higher level component. The higher level component can receive EoS 362. EoS 362 indicates to the higher level component that disassembler 314 no longer has messages for the higher level component.

Figure 5:
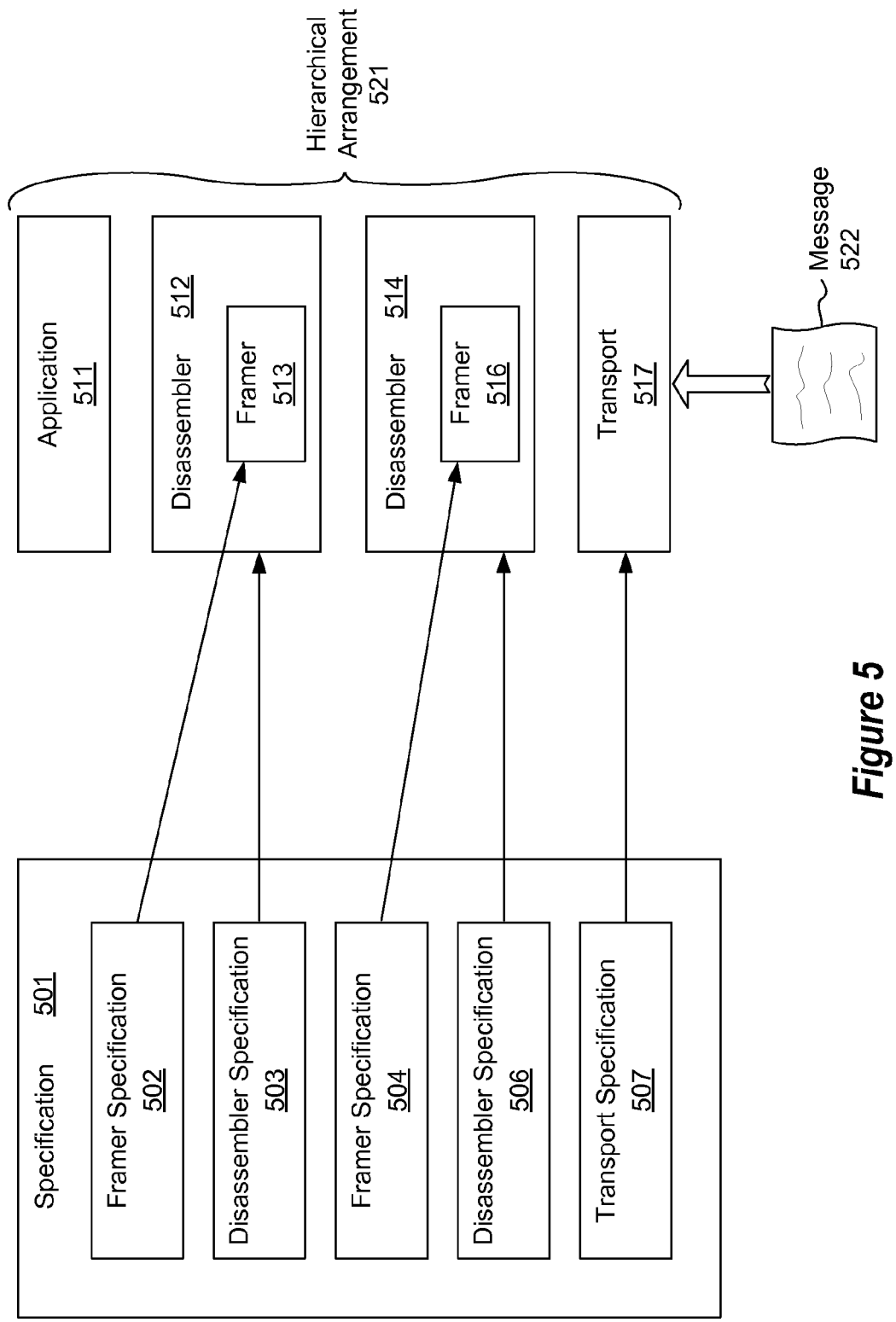
FIG. 5 illustrates a messaging pipeline specification and corresponding hierarchical arrangement of messaging components.

In some embodiments, a hierarchal arrangement of message processing components is defined in a specification including a list of specification elements. For example, referring now to FIG. 5, specification 501 includes framer specification 502, disassembler specification 503, framer specification 504, disassembler specification 506, and transport specification 507.

During runtime, a hierarchal arrangement of message processing components is built from the specification. For example, hierarchical arrangement 521 can be built from specification 501. As depicted, hierarchical arrangement 521 includes transport 517, disassembler 514, disassembler 512, and application 511. Transport 517 is established in accordance with transport specification 507. Disassembler 514 is established in accordance with disassembler specification 506. Disassembler 512 is established in accordance with disassembler specification 503.

Messages, such as, for example, message 522, are initially received at transport 517. Messages are based up hierarchical arraignment 521 towards application 511. Each disassembler can process and remove a level of nested messages and pass the nested messages individually up to the next component. Framers can be loaded (e.g., at runtime) to parse and identify nested messages. Framers can be established in accordance with framer specifications. For example, framers 516 and 513 can be established in accordance with framer specifications 504 and 502 respectively.

Generally, a disassembler is part of a linear set of execution components in a hierarchy. However, a framer is not necessarily part of this linear set of execution components. At runtime, a framer can be a nested sub-component inside the disassembler and (e.g., as previously described) can have an object lifetime that is independent of the object lifetime of other execution components. An appropriate transformation is achieved by having the framer specification element add itself to the shared context rather than building a pipeline component.

A disassembler specification follows the framer specification in the runtime build process and looks for the framer factory in the shared context. On finding it, it creates a disassembler listener object with the framer factory as a parameter. More than one framer and disassembler may appear in a hierarchy, thus producing a hierarchical series of message disassemblers.

Accordingly, embodiments of the invention provide mechanisms for disassembling messages. The functionality of disassemblers and framers is decoupled such that framers for different types of messages can be utilized at the same level in a hierarchy without having to also change disassemblers. Virtually any level of disassembly is possible to address any corresponding level of message nesting. Disassembly can be performed on a per message or per session basis.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including one or more processors, system memory, and a messaging stack, the messaging stack having a hierarchical arrangement of components including a lower layer transport component, one or more disassembler components, and an upper layer application component, the lower layer transport component being below the one or more disassembler components and the upper layer application component in the hierarchical arrangement of components, the upper layer application component being above the lower layer transport component and the one or more disassembler components in the hierarchical arrangement of components, the computer system also including a framer factory for creating framers that can be contained within the one or more disassembler components to parse messages, a method for disassembling one or more messages, the method comprising:

an act of a disassembler component, selected from among the one or more disassembler components, receiving a message from a component immediately below the disassembler component in the hierarchical arrangement of components, the message containing one or more nested messages within the message;

an act of the disassembler component indicating a message type for the message to the framer factory;

an act of the framer factory providing a framer to the disassembler component, the framer for parsing the message;

an act of the disassembler component indicating the start of a session to the component immediately above the disassembler component in the hierarchical arrangement of components, the session being between the disassembler component and the component immediately above the disassembler component;

for each of the one or more nested messages in the message, including a last nested message, and subsequent to indicating the start of the session:
  an act of the framer parsing the message to identify the next nested message, from among the one or more nested messages, contained within the message; and
  an act of the disassembler component sending the identified next nested message to the session; and
an act of the disassembler indicating the end of the session to the component immediately above the disassembler component.

2. The method as recited in claim 1, further comprising an act of the disassembler component receiving an indication of a start of a second session from the component immediately below the disassembler component prior to receiving the message from the component immediately below the disassembler component, the second session between the disassembler component and the component immediately below the disassembler component.

3. The method as recited in claim 2, wherein the act of the disassembler component receiving a message comprises an act of the disassembler component receiving the message on the second session.

4. The method as recited in claim 3, further comprising:
an act of a disassembler component receiving a second message on the second session;
an act of the disassembler component sending the second message to the framer factory;
an act of the framer factory providing a second framer to the disassembler, the second framer for parsing the second message; and
for each of the one or more nested messages in the second message, including a last nested message:
  an act of the second framer parsing the second message to identify the next nested message, from among the one or more nested messages, contained within the second message; and
  an act of the disassembler component sending the identified next nested message to the session.

5. The method as recited in claim 4, further comprising an act of receiving an indication of the end of the second session from the component immediately below the disassembler component prior to the disassembler indicating the end of the session to the component immediately above the disassembler component.

6. The method as recited in claim 4, wherein the act of the disassembler component receiving the message on the second session comprises an act of the disassembler component receiving the message using a transaction; and
wherein the act of the disassembler component receiving a second message on the second session comprises an act of the disassembler component receiving the second message using the transaction.

7. The method as recited in claim 1, wherein the act of a disassembler component receiving a message from a component immediately below the disassembler component in the hierarchical arrangement of components comprises an act of the disassembler component receiving a message with a transaction; and
wherein for each of the one or more nested messages in the message the act of the disassembler component sending the identified next nested message to the session comprises an act of the disassembler component sending the identified next nested message to the session using the transaction.

8. The method as recited in claim 1, further comprising prior to the act of the disassembler component indicating the start of a session to the component immediately above the disassembler component in the hierarchical arrangement of components, an act of the component immediately above the disassembler component accepting a new session from the disassembler component.

9. The method as recited in claim 8, wherein the act of the component immediately above the disassembler component accepting a new session from the disassembler component comprises an act of the component immediately above the disassembler component accepting a new session using a transaction; and
wherein for each of the one or more nested messages in the message the act of the disassembler component sending the identified next nested message to the session comprises an act of the disassembler component sending the identified next nested message to the session using the transaction.

* * * * *